Patented May 26, 1942

2,284,142

UNITED STATES PATENT OFFICE 2,284,142

METHOD OF RECLAIMING COATING MATERIALS

Daniel M. Gray, Wheeling, W. Va., assignor to Hazel-Atlas Glass Company, Wheeling, W. Va., a corporation of West Virginia No Drawing. Application September 3, 1938, Serial No. 228,457

27 Claims. (Cl. 260—86)

This invention relates to the reclaiming of various coatings from laminated materials. More particularly, the invention is concerned with the recovery of one or more layers of valuable coating materials associated with one or more layers of absorbent material in a coated or laminated form.

The term "laminated materials" as used in this application includes a material composed of two or more layers of different materials, i. e., a single layer of backing material having a single coating, as well as a plurality of layers, of the same or different materials, with a coating or adhesive material on or between them. The term "coating materials" includes adhesive materials used between layers of backing material, as well as outside coatings. The term "absorbent" is intended to include adsorbent materials and other materials which are porous and may be readily penetrated by the saturant.

Coating materials are frequently applied to relatively absorbent bases to form laminated sheet materials for various purposes. Such coating materials include various resinous materials, such as polymerized vinyl resins and other polymerized resins, for example, methyl acrylate polymers, polymerized styrene, polymerized cumarone, polymerized indene, polymerized olefines, and polymerized di-olefines, rubber and derivatives thereof, such as halogenated rubber or rubber resins, phenol aldehyde resins of the permanently soluble type, also alkyd resins, cellulose esters and ethers and other similar materials. They also include natural resins, such as amber, copal, dammar, kauri, elemi, shellac and rosin, either alone or combined with oils, such as linseed, chinawood, castor, rapeseed, poppyseed, soya bean and cottonseed and other materials, such, for example, as films of wax, for instance, paraffin, carnauba, beeswax, ceresin and other mineral, animal and vegetable waxes. The base material may be of a fibrous cellulosic material, such as paper, cardboard, pulp board, etc., or of a non-fibrous material, such as relatively porous regenerated cellulose, "Cellophane," cellulose derivatives, etc. or of other suitable material. The present invention is particularly useful with the more porous backing materials.

One or more layers of the coating material may be employed either as an outside coating for one or more layers of absorbent base or as a binding agent between two or more layers of the absorbent base. Laminated materials of this type are commonly used in making liners for the closures of various bottles and other containers. In making such liners, the laminated material is made up in sheet form and the liners, usually circular in shape, are cut from the sheet of laminated material. This leaves a considerable proportion of unavoidable scrap laminated material containing one or more valuable coating layers.

The recovery of a coating layer from laminated materials having a porous or absorbent layer, by a direct treatment of the laminated material with a solvent is distinctly uneconomical and in most cases entirely impractical for the reason that a porous base material such as paper or pulp board would absorb a very large proportion of the solvent used. In most cases, the cost of the solvent would be greater than the value of the soluble coating material recovered, especially when the film of coating material is relatively thin as compared to the layer or layers of absorbent base, for example, where the resinous film is in the order of one thousandth of an inch thick as compared with twenty to forty thousandths of an inch thickness for the base material. In any event, after direct treatment of such laminated material with the solvent, the base material would have to be subjected to a further recovery treatment in order to recover solvent therefrom. Otherwise, the solvent absorbed would be lost and the best use could not be made of the base material.

One object of this invention is to provide a new and economical process for reclaiming such coating layers from sheet or finely comminuted laminated material, or any intermediate form between these two, by the use of a solvent for the coating.

A further object of the invention is to recover such a coating layer in such a manner as to leave the porous base material in a suitable form for economical reclaiming.

Other objects of the invention will be in part explained and will become apparent from the following description of the invention.

The present invention provides a process for recovering a coating layer from a porous base laminated material using only a small fraction of the solvent that would be required for direct treatment of the laminated material. This is made possible by first treating the sheet or comminuted laminated material with a saturant which wets and is absorbed by the porous, absorbent base and which does not have an appreciable effect upon the layer or layers of coating material. For most purposes, water is an ideally suited saturant, although other saturants may also be used. After the base material has been thoroughly saturated with the saturant, the mass may be exposed to a solvent in which the coating material is soluble but which solvent is not mutually soluble or miscible to any appreciable extent with the saturant, or at most only to a relatively small extent. Under these conditions, it has been found that the saturant previously absorbed by the porous base material remains in place and is not displaced by the solvent. Further, the presence of a saturant, such as water or other aqueous medium, in the base material does not prevent the solvent from effectively dissolving the coating material. After a suitable time of treatment of the saturated laminated material with the solvent, either with or without agitation, the treated mass of material may be removed from the solvent and the solvent readily drains out of the mass carrying with it the coating material it has dissolved from the material treated.

The solution of coating material thus obtained may be treated in any suitable way to separate the coating material from the solvent, as by distillation or evaporation of the solvent or by precipitation of the waxy or resinous material from the solution, for example, by means of a liquid that is a non-solvent for the wax or resin but is miscible with the solvent. When the solvent employed is properly selected and the dissolved coating material is suitable, the solution of coating material may be used directly without further treatment as a varnish, lacquer or other coating or as a constituent therefor. It is preferable, especially when treating successive batches of laminated material, to use the same solvent over again for treating several successive batches. In this event, the solution of coating material would be used to extract and reclaim further quantities of coating layers from additional saturated laminated materials until the solvent becomes too saturated with coating material for practical further use.

If desired the base material saturated with the saturant may be simply discarded after the solvent extraction of coating material. However, the treatment described herein puts it in a condition more acceptable for reclaiming or after treatment and it may be dried and/or reclaimed for use in various products, such as paper, paperboard, pulp-board, regenerated cellulose, and various other materials.

The saturant employed should be one that does not chemically affect or dissolve the coating material to be reclaimed to any substantial extent. In fact, it is preferable to employ a saturant which does not appreciably wet the coating material. For most purposes, water is very satisfactory as a saturant since it is economical, readily absorbed by any paper-like or other porous base of the laminated material and does not affect or substantially wet various coating materials which may be reclaimed according to this invention. Water is also particularly satisfactory because it is immiscible with a great many organic solvents suitable for purposes of this invention. Other liquids may be employed as saturants, however, providing they satisfy the foregoing requirements. For example, such materials as kerosene, mineral spirits, glycerine, glycols and coal tar solvents, or mixtures of such materials, with or without water, if non-solvents for the particular coating material being reclaimed and if readily absorbed by the base material used, may be used as saturants instead of water.

The solvent employed, in addition to satisfying commercial requirements that will be apparent to those skilled in the art, should be one that is little or not at all mutually soluble with the saturant, but which readily acts upon and dissolves the coating material to be reclaimed. Since most organic solvents are not mutually soluble with water, they are eminently suitable for this purpose when water is used as a saturant. The particular solvent to be selected, of course, will depend upon its ability to dissolve the particular coating material to be reclaimed. For example, where the laminated material being treated consists of paper and/or pulp board coated with a vinyl resin, such as a conjoint polymerization product of a mixture of about 80% vinyl chloride and 20% vinyl acetate ("vinylite"), ethylene dichloride is a very satisfactory solvent. A typical example of such material is paper coated with polymerized vinyl resin, which paper has been bonded to mechanical wood pulp board by means of a water soluble adhesive such as a hide glue plasticized with glycerine and commercial glucose. Such a material is typical of that used for the lining or gasket material used in container closures. A typical composition of such a material on a moisture-free basis is about 73% of pulp, about 9% of paper, about 13% of polymerized vinyl resin ("vinylite") and about 5% of water soluble adhesive securing two or more layers of the paper and wood pulp board together. Bone glue, various forms of gelatin, starch or casin may also be used as the water soluble adhesive.

When such scrap material is immersed directly in ethylene dichloride, the scrap material will absorb an amount of the ethylene dichloride approximately equal in weight to the weight of the laminated material. If the laminated material, however, is immersed in plain water before being subjected to the ethylene dichloride, it will absorb approximately 1½ to 2 times its weight of water. When the water saturated scrap material is then immersed in ethylene dichloride, no appreciable absorption of ethylene dichloride by the water saturated laminated material takes place, nor does the water saturated scrap material lose any appreciable amount of the absorbed water into the ethylene dichloride. After a suitable treatment of the water saturated laminated material with ethylene dichloride, however, it will be found that the resin film has been substantially all dissolved by the ethylene dichloride and that the resin will remain dissolved in the ethylene dichloride when the scrap material is separated from the solvent. It is apparent, therefore, that the amount of ethylene dichloride required in accordance with this invention will be less than the amount required to treat this particular liner scrap directly, by the amount of ethylene dichloride equal to the weight of the original liner scrap.

Other typical examples of laminated materials that may be treated are halogenated rubber resins laminated to paper and/or pulp board, cellulose ethers or esters, for instance cellulose nitrate, films on a relatively porous regenerated cellulose base material, lacquer coatings or varnishes on paper, pulp board or other fibrous or non-fibrous cellulose bases. Essential features of such examples are a film which may be dissolved in a suitable solvent, plus a base material which is absorbent or adsorbent, i. e., porous and relatively non-saturated and which can, therefore, be readily penetrated by the saturant.

The technique of procedure and the apparatus employed for treating laminated or coated materials with a saturant and a solvent in accordance with this invention may be widely varied. For example, a tank may be provided containing a quantity of ethylene dichloride or other solvent and a suitable quantity of water or other saturant. Where water and ethylene dichloride are employed, the two liquids will separate, the water forming a liquid layer on top of the ethylene dichloride layer by reason of the difference in their specific gravities. The material to be treated, such as liner scrap, may be conveniently soaked in water and then immersed first in the water layer by placing the scrap in a large perforated, covered basket which is lowered into the tank. Or the material may be immersed directly in the water. In either event the scrap will be left in the water layer long enough to make sure that the absorbent base material is fully saturated with water, whereupon the basket will be lowered into the solvent layer and the coating layer or layers will be dissolved by the ethylene dichloride. The basket containing the scrap or the solvent is preferably agitated or circulated during this treatment, although the solvent and basket may be left in a quiescent state during the extraction, if desired. After the coating material is deemed to be substantially dissolved, the basket will be pulled up into the water layer and any solvent clinging to the material in the basket will be allowed to drain back into the solvent layer. The basket may then be removed from the tank and the remaining paper and/or pulp dried and reclaimed, or discarded as may be expedient. It will be apparent, of course, that such a procedure could be carried out continuously by employing a tank of suitable shape containing both solvent and saturant, and by moving the laminated material first through the water and then through the solvent layer and finally again through the water layer by means of a suitable conveyor or guide rollers.

Other forms of apparatus, including provision for agitation of the material during treatment or recirculation of the solvent, may be employed. For example, the solvent and saturant may be employed in separate tanks, or in separate compartments of one tank. Agitation of saturant soaked laminated material with the solvent or with a mixture of solvent and saturant, whereby the junction between the solvent and saturant is lost, usually produces a more complete solution of the coating material in the solvent and prevents matting or felting of the laminated material. The degree of agitation should be such as to insure contact of the solvent with the resinous coating to be removed and to prevent matting or felting of the material. The solvent does not displace the saturant from the saturant soaked base material even when such agitation is employed. Various other procedures could be employed, such as pumping or spraying the solvent over the mass of laminated scrap material previously saturated with water or other saturant. Under these conditions, the ethylene dichloride or other solvent percolates through the wetted mass, dissolving the resin film as it passes through and, by reason of its higher specific gravity, settles to the bottom layer with the resin in solution. Other procedures and apparatus which might be employed will be apparent to those skilled in the art.

When the laminated material to be treated is coated or otherwise impregnated with a wax or saturant repellent, such as paraffin, and also contains a layer of another coating material that will not be dislodged by heat, it may be desirable to treat the laminated material first by subjecting it to the action of boiling water or other saturant to remove the wax. When such material is immersed in a saturant which is heavier than the wax or wax-like coating and which is not miscible with it, such, for example, as boiling water, the paraffin or other low melting point material is readily melted and floats to the surface, so that it may be skimmed from the surface of the water and recovered or discarded. Such a treatment saturates the absorbent base material with saturant at the same time that it removes the wax, and the other coating material may then be reclaimed by treating the saturated de-waxed laminated material with a solvent. When a coating of wax or other material that might be dislodged by heat is to be reclaimed with the solvent, the treatment with the saturant should be cold.

A great many solvents may be employed, depending upon the particular nature of the materials to be treated. Such solvents should be mutually insoluble with the water or other saturant and should have a specific gravity different therefrom. It is preferred to employ a solvent having a specific gravity greater than the specific gravity of the saturant so that the solvent and saturant may be readily employed in one tank as described above. This is especially desirable when the solvent is relatively volatile because the saturant may be used to minimize volatilization. Organic solvents suitable for this purpose when water is employed as a saturant are ethylene dichloride, chloroform, carbon tetrachloride, carbon tetrabromide, tetrabromethane, tetrachlorethane, hexachlorethane and trichlorethylene, monochlorobenzene, orthodichlorobenzene, dichlorethylether, carbon disulfide, halogenated naphthalenes, ethylene glycol monobenzyl ether, benzyl alcohol, furfural, furfuryl acetate, diphenyl, dibenzyl ether, benzyl benzoate, dimethyl phthalate, diethyl phthalate, dibutyl phthalate, di-amyl phthalate, ethylene glycol monoethyl ether phthalate, triacetin, tricresyl phosphate, butyl phthalyl butyl glycolate, ethyl phthalyl ethyl glycolate, methyl phthalyl ethyl glycolate, and other similar solvents having a specific gravity greater than one and having low relative mutual solubility with water. Other solvents may be employed, however, even though they have a lower specific gravity than the specific gravity of the saturant. Solvents of this class which may be useful with water as a saturant are benzol, xylene, toluene, solvent naphtha, mineral spirits, Paint and Varnish Makers' naphtha, kerosene, gasoline, methyl isobutyl ketone, 2-propyl ketone, pine oil, di-ethyl ketone, mesityl oxide, secondary butyl acetate, normal butyl acetate, secondary amyl acetate, butyl butyrate, hexyl acetate, octyl acetate, ethylene glycol monobutyl ether acetate, and similar solvents. When such lighter solvents are used, the laminated material, of course, should be wet with a saturant before it is introduced into the solvent layer. Mixtures of solvents or mixtures of saturants may also be employed.

When the solvent and saturant employed are close to each other in specific gravity, the specific gravity of either of the two may be readily increased by dissolving a suitable substance in it.

For example, if it is desired to increase the specific gravity of the saturant when water is employed as the saturant, such materials as sodium chloride, calcium chloride, magnesium sulfate and the like may be dissolved in the water. Similarly, if it is desired to increase the specific gravity of the solvent, it may be mixed with a suitable heavier solvent with which it is miscible, or suitable substances may be added to or dissolved in the solvent for this purpose. For instance, a solvent of specific gravity greater than one may be mixed with a solvent of specific gravity less than one, in such proportions that the mixture will have a specific gravity greater than one. Or a solid having a specific gravity greater than one may be dissolved in the solvent of specific gravity less than one. An example of such is, a mixture of 45 parts by weight of a halogenated naphthalene waxy solid (specific gravity 1.65) and 55 parts by weight of toluene (specific gravity 0.86). This mixture yields a mobile liquid solvent having a specific gravity of approximately 1.1, which is at the same time substantially immiscible with water.

In cases where it is desired to employ a non-aqueous saturant, such as mineral spirits, solvents having a specific gravity different from mineral spirits and substantially immiscible with it may be used, such as acetonyl acetone, glycol diacetate, diglycol di-acetate, ethylene glycol monomethyl ether, diethylene glycol monomethyl ether, ethylene glycol monobenzyl ether, furfural, furfuryl acetate, furfuryl alcohol and tetrahydrofurfuryl alcohol.

In the application of the invention to other laminated materials somewhat different procedure may be desirable. For example, with a liner or other laminated material consisting of pulpboard to which is laminated a film of a halogenated rubber derivative by means of a water-insoluble pigmented adhesive, different solvents and a slightly different procedure may be desirable. For example, in reclaiming a halogenated rubber derivative material, such as a rubber hydrochloride resin ("Pliofilm"), laminated to pulpboard with a fusible modified alkyd resin pigmented with a white pigment, such as titanium dioxide or with a water insoluble adhesive such as "Pliolite," rosin or ester gum, pigmented or not, the liner scrap or other laminated material may be first thoroughly saturated with water in the usual manner; it then may be immersed in chloroform which is an effective solvent for the halogenated rubber derivative material. Since chloroform is heavier than water and immiscible with it, the process can be carried out in a tank containing a supernatant layer of water and an underlying layer of chloroform. The chloroform not only dissolves the halogenated rubber resin, but also dissolves the water-insoluble adhesive.

In following this procedure the reclaimed resin solution contains the adhesive and if it is necessary to recover the resin substantially free from the adhesive, a further modification of the process may be used. For example, the scrap material may be first saturated with water, as before, and then immersed in a solvent which dissolves the particular adhesive used but does not affect the halogenated rubber film, for instance, methyl isobutyl ketone if an alkyd resin is used. Since methyl isobutyl ketone is lighter than water and substantially immiscible with it, it may be desirable to add to the methyl isobutyl ketone a solvent such as carbon tetrachloride in sufficient proportions to make the mixture of solvents heavier than water. This mixture would still permit the dissolving of the adhesive without affecting the halogenated rubber film. After treatment with this mixture, to remove the adhesive, the mass may then be placed in chloroform to dissolve the halogenated rubber. By this means, the halogenated rubber may be put into solution substantially free from the adhesive.

Should it be desired to recover the resin in solid form from the chloroform solution, this may be done readily by adding ethyl alcohol to the chloroform solution to precipitate the halogenated rubber from the solution. The alcohol and chloroform could then be separated by fractionation for repeated use. Other alcohols, such as methanol, butanol, propanol, etc., may be used for this purpose.

This invention makes use of a selective wetting action by and absorption of the saturant which is employed to saturate part of the laminated material to be treated before treatment with solvent. Various introfiers may be employed with the saturant to enhance its wetting action on the base material. For example, where water is employed as a saturant, its wetting power may be intensified by the addition of agents such as salts of lauryl alcohol and similar high molecular weight alcohols, the esters, salts or other compounds of fatty acids or of other alcohols or of the aliphatic or aromatic amines, sulfates or sulfonates of naphthalene, sulfonated fatty acids, or similar water soluble wetting agents or introfiers. Inorganic materials, such as alkali and alkaline earth bases or compounds, for example, sodium carbonate, sodium hydroxide, calcium hydroxide, or sodium metasilicate may also be employed for increasing the wetting action of the saturant on the base material. These wetting agents or introfiers are not necessary but may be employed where it is desired to increase the efficiency of the process.

Other applications of the invention will, of course, be obvious to those skilled in the art as well as the necessity or desirability of modifying the procedures described, to make them applicable to varying conditions and requirements.

The terms and expressions employed are used as terms of description and not of limitation, and it is intended, in the use of such terms and expressions, not to exclude any equivalents of the features shown and described or portions thereof, it being recognized that various modifications are possible within the scope of the invention claimed.

I claim:
1. A process of reclaiming a coating layer from laminated material having an unsaturated absorbent layer capable of absorbing a substantial portion of the solvent to be used in reclaiming the coating layer, comprising saturating the absorbent layer with a saturant that does not appreciably affect the coating layer, and treating the saturated laminated material with a solvent for said coating layer that is at most only slightly miscible with said saturant.

2. A process as defined in claim 1 in which the solvent and saturant have substantially different specific gravities.

3. A process as defined in claim 1 in which the solvent is heavier than the saturant and the laminated material to be treated is lowered into the solvent through a superimposed layer of the saturant.

4. A process as defined in claim 1 in which the saturated laminated material is agitated with the solvent.

5. A process as defined in claim 1 in which the solvent and saturant have substantially different specific gravities and the saturated laminated material to be treated is agitated in a mixture of solvent and saturant.

6. A process as defined in claim 1 in which a substance is dissolved in the solvent to increase the specific gravity thereof.

7. A process as defined in claim 1 in which a substance is dissolved in the saturant to increase the specific gravity thereof.

8. A process as defined in claim 1 in which the saturant contains an introfier.

9. A process as defined in claim 1 in which the material being treated is passed through a layer of the saturant into a layer of the solvent and is withdrawn through a layer of the saturant.

10. A process of reclaiming a coating layer from laminated material having an unsaturated absorbent layer capable of absorbing a substantial portion of the solvent to be used in reclaiming the coating layer, comprising saturating the absorbent layer with a saturant that does not appreciably affect the coating layer, thereafter dissolving the coating layer from the saturated absorbent layer in a solvent that is substantially immiscible with said saturant, and separating the solution of coating material from the remaining material.

11. A process as defined in claim 10 in which the coating material is precipitated from the separated solution of it.

12. A process of reclaiming a resinous layer from laminated material constituted principally of unsaturated absorbent fibrous cellulosic base material capable of absorbing a substantial portion of the solvent to be used in reclaiming the resinous layer, comprising soaking the laminated material in a liquid that does not materially wet the resinous layer but is absorbed by the base material, and subjecting the soaked laminated material to a solvent capable of dissolving said resinous layer, said solvent being substantially mutually insoluble with said liquid.

13. A process of reclaiming a coating layer from laminated material having an unsaturated absorbent layer to which the coating layer is bonded by a bonding agent said absorbent layer being capable of absorbing a substantial portion of the solvent to be used in reclaiming the coating layer, comprising saturating the absorbent layer with a saturant that is a solvent for the bonding agent but that does not appreciably affect the coating layer, and treating the saturated laminated material with a solvent for said coating layer that is at most only slightly miscible in said saturant.

14. A process of reclaiming a coating layer from laminated material having an unsaturated absorbent layer to which the coating layer is bonded by a bonding agent said absorbent layer being capable of absorbing a substantial portion of the solvent to be used in reclaiming the coating layer, comprising saturating the absorbent layer with a saturant that is a nonsolvent for the bonding agent and that does not appreciably affect the coating layer, treating the saturated laminated material with a solvent for the bonding agent that is a nonsolvent for the coating layer and that is at most only slightly miscible with said saturant, and then treating the material with a solvent for the said coating layer that is at most only slightly miscible with said saturant.

15. A process of reclaiming a resinous layer from laminated material constituted principally of porous unsaturated cellulosic material capable of absorbing a substantial portion of the solvent to be used in reclaiming the resinous layer, comprising soaking the laminated material in water, and subjecting the water saturated laminated material to the action of an organic solvent substantially immiscible with water but capable of dissolving the resinous layer.

16. A process as defined in claim 15 in which the solvent is heavier than water and the laminated material is lowered into the solvent through a superimposed layer of water.

17. A process as defined in claim 15 in which the water saturated laminated material is agitated in a solvent for the resinous layer.

18. A process as defined in claim 15 in which the water saturated laminated material is agitated in a mixture of solvent and water.

19. A process as defined in claim 15 in which the solvent is sprayed over the water soaked laminated material.

20. A process as defined in claim 15 in which the water saturated material is thereafter separated from the solvent and dried.

21. A process as defined in claim 15 in which the water used as a saturant contains an introfier.

22. A process of reclaiming a resinous coating layer from a laminated material including a porous unsaturated backing material capable of absorbing a substantial portion of the solvent to be used in reclaiming the coating layer, said backing material having such a coating layer and a low melting point coating thereon, comprising heating the laminated material to a temperature above the melting point of the low melting point coating in a saturant that is substantially immiscible with both of the said coating layers and is of different specific gravity than said low melting point coating and thereafter treating the saturated laminated material with a solvent for the resinous coating layer that is at most only slightly miscible with the saturant.

23. A process of reclaiming a resinous layer from laminated material constituted principally of porous unsaturated cellulosic material capable of absorbing a substantial portion of the solvent to be used in reclaiming the resinous layer, said cellulosic material having a resinous layer and a wax thereon, comprising subjecting the laminated material to hot water to melt said wax, and thereafter treating the dewaxed water saturated laminated material with a solvent for said resinous layer that is substantially immiscible with water.

24. A process of reclaiming a vinyl resin from laminated liner scrap having an unsaturated layer capable of absorbing a substantial portion of the ethylene dichloride to be used in reclaiming the vinyl resin, comprising soaking said scrap in water, and thereafter dissolving the resin from the water soaked laminated scrap in ethylene dichloride.

25. A process of reclaiming a coating layer from a laminated material having a porous absorbent base, comprising passing the laminated material through a layer of a liquid that is a nonsolvent for the coating layer, which liquid forms an immiscible layer upon a layer of solvent for the coating layer, and then passing the laminated material into and through the solvent layer.

26. A process of reclaiming a coating layer from a laminated material having a porous absorbent base, comprising passing the laminated material through a layer of water upon and immiscible with a layer of solvent for the coating layer, and then passing the laminated material into and through the solvent layer.

27. A process of reclaiming a coating layer from a laminated material having a porous absorbent base, comprising passing the laminated material through a layer of water upon and immiscible with a layer of solvent for the coating layer, then passing the laminated material into and through the solvent layer, and withdrawing the base material through the water layer.

DANIEL M. GRAY.